United States Patent [19]

Weseloh et al.

[11] 4,354,302
[45] Oct. 19, 1982

[54] JACKING TOOL FOR INSTALLING AND REMOVING DRAFT GEARS ON RAILWAY CARS

[75] Inventors: Roger J. Weseloh, South Holland; Russell G. Brandsma, Hazel Crest; John R. Hoshour, Country Club Hills, all of Ill.

[73] Assignee: American Standard Inc., Chicago, Ill.

[21] Appl. No.: 189,248

[22] Filed: Sep. 22, 1980

[51] Int. Cl.³ .............................. B23P 19/04
[52] U.S. Cl. ........................ 29/252; 29/261; 254/93 R; 91/422; 91/445
[58] Field of Search ............... 29/252, 261; 91/422, 91/445; 254/93 R

[56] References Cited

U.S. PATENT DOCUMENTS 2,956,336 10/1960 Peterson .
3,534,661 10/1970 Hettlinger .
3,534,942 10/1970 Carlson .

Primary Examiner—Robert C. Watson
Attorney, Agent, or Firm—R. S. Visk

[57] ABSTRACT

A fluid pressure operable jacking tool having oppositely disposed locking arms. With the draft key and coupler removed, the locking arms of the jacking tool, when installed, biasingly engage the coupler cross key slots formed in the draft gear yoke, so that a fluid pressure powered ram of the jacking tool abuts against the draft gear follower. A fluid pressure line is connected to the jacking tool and, when provided with fluid pressure, causes the jacking tool ram head to compress the draft gear to allow removal of the draft gear and jacking tool from the car center sill together. Once removed, pressure is released from the jacking tool to permit separation thereof from the draft gear. If the draft gear is to be installed, a reverse procedure would be employed.

16 Claims, 14 Drawing Figures

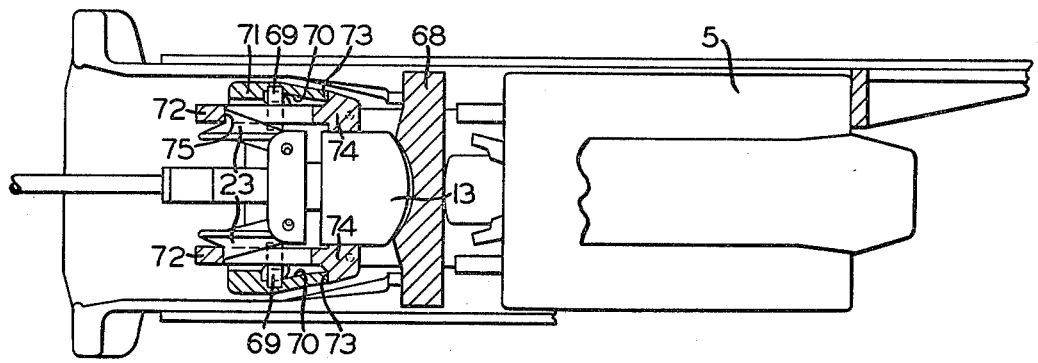
_Fig.8_
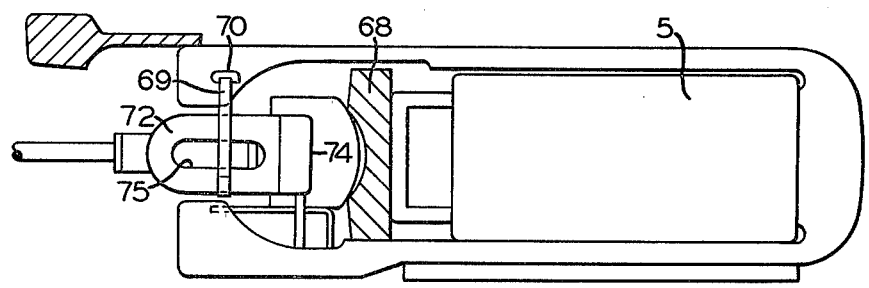
_Fig.9_
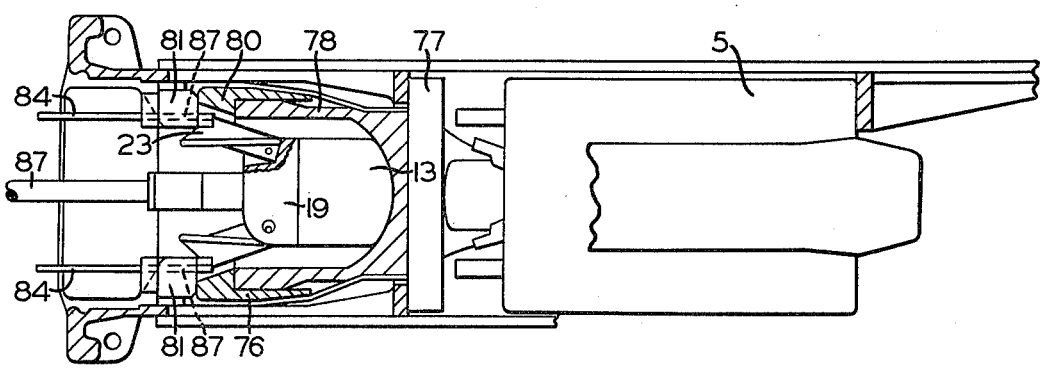
_Fig.10_

JACKING TOOL FOR INSTALLING AND REMOVING DRAFT GEARS ON RAILWAY CARS

BACKGROUND OF THE INVENTION

Presently known devices used for installing and removing draft gears are objectionable for several reasons: (1) the older type draft gear compressing units or jacking devices are not capable of producing an adequate force for compressing the higher capacity draft gears now in service; (2) presently known jacking units also include a "hold coupler" by which the hose providing hydraulic fluid pressure can be disconnected from the jack unit without releasing the pressure therein, but these "hold couplers," however, are cumbersome, and at times, during removal of the jacking unit and the draft gear, have been broken off against the coupler carrier; (3) no return spring is provided for restoring the hydraulic ram to its normal position after it has been used and must be returned to its normal position by manual manipulation.

SUMMARY OF THE INVENTION

The principal object of the present invention, therefore, is to provide a jacking device for use in installing and removing draft gears from railway cars with greater facility within the space limitations available.

Briefly, the invention comprises a draft gear jacking device of the hydraulic type having pivotally biased arms for engaging the coupler key slots in the yoke after the coupler has been removed. The jacking unit is provided, within the physical limits thereof, with a check valve which permits flow of hydraulic pressure into the ram for compressing the draft gear, and for holding said pressure after the hydraulic hose has been removed, so that the draft gear and jacking device may be removed as a unit. A tubular handle screwable into the jack, when screwed in a certain direction, unseats the check valve to allow release of the pressure.

BRIEF DESCRIPTION OF THE DRAWINGS

In the drawings:

FIG. 1A shows a modification of that portion of the device shown in area A of FIG. 1;

FIG. 8 is a horizontal view, mostly in outline, showing a further adaptation of the jacking device with the butt end of another type coupler arrangement;

FIG. 9 is an elevational view of the adaptation shown in FIG. 8;

FIG. 10 is a horizontal view, mostly in outline, of yet another adaptation of the jacking device with the butt end of still another type coupler arrangement;

DESCRIPTION AND OPERATION

U.S. Pat. Nos. 2,956,336, 3,534,661, and 3,534,942 were considered in preparation of this application.

Figure 1:
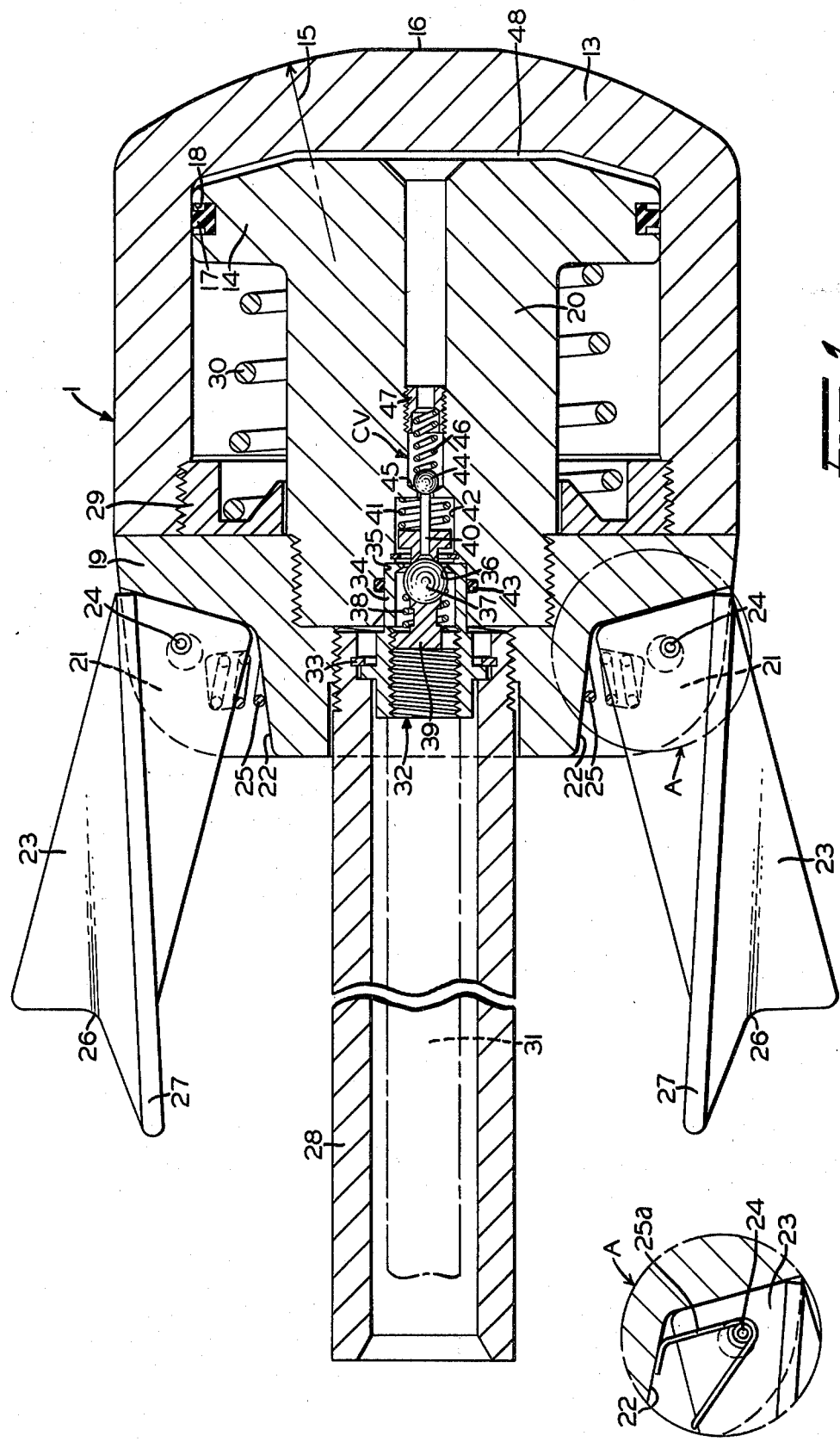
FIG. 1 is a horizontal view, in section, of a hydraulic jacking device embodying the invention.
Figure 2:
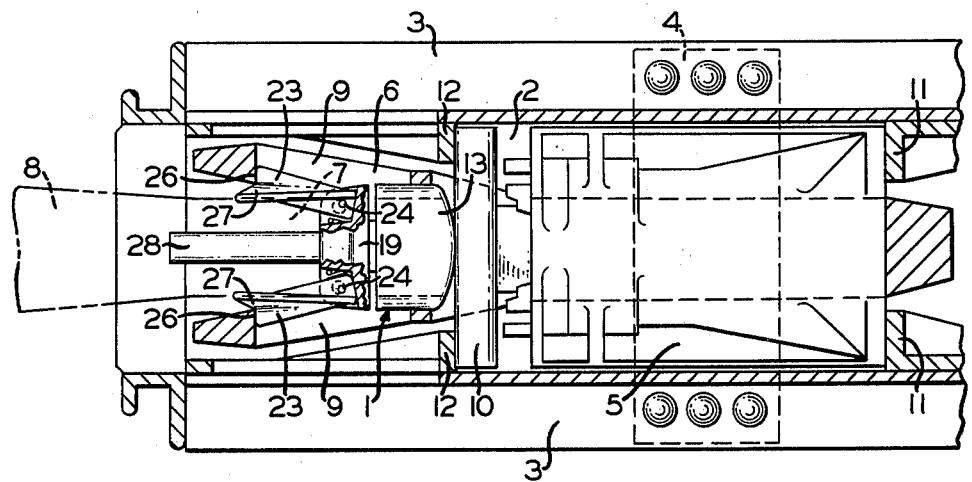
FIG. 2 is a horizontal view, mostly in outline and on a smaller scale than FIG. 1, showing the hydraulic jacking device in operating position relative to a railway car draft gear in a center sill of the car.

A hydraulic jacking device for use in the installation and removal of draft gears on railway cars and embodying the invention, is shown in FIG. 1 of the drawings before being installed for operation. The hydraulic jacking device or draft gear-compressing device shown in FIG. 1 as shown in FIG. 2 in an installed or operation position (after the coupler has been removed) in a draft gear pocket 2 of a pair of conventional parallel center sills 3 of a railway car (not shown). The arrangement shown in FIG. 1 is an adaptation of the jacking device 1 to a draft gear arrangement used with a conventionally known E type coupler. A carrier plate 4 is secured, as by rivets for example, under the spanning center sills 3 for supporting a conventional draft gear 5, which is surrounded by a vertically disposed yoke 6. Yoke 6 is designed for and is normally connected to a shank 7 of a well known E type coupler 8, which is partially indicated in broken outline in the drawing, by a horizontally disposed draft key (not shown) passing through oppositely disposed key slots 9 formed in each arm of said yoke in substantially parallel relation to each other and to the longitudinal axis of the yoke. A coupler follower 10 is positioned at the outer end of draft gear 5 and is adapted to be contacted by the butt end of coupler 8 for transmitting buff or draft forces between coupler 8 and draft gear 5. Inner and outer pairs of stop lugs 11 and 12, respectively, are fixed to the center sills 3, so that the inner end of draft gear 5 is normally resting against inner lugs 11, while follower 10 is resting against outer lugs 12, when the draft gear is not subjected to either draft or buffing forces.

Figure 3:
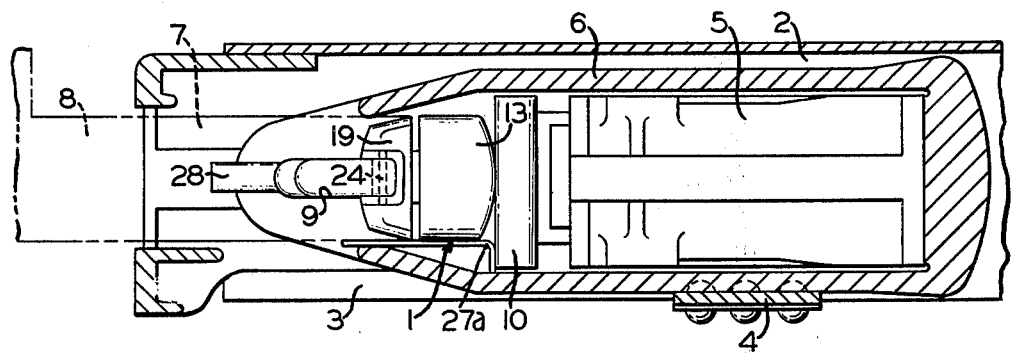
FIG. 3 is an elevational view, partly in section and partly in outline and on the same scale as FIG. 2, showing the hydraulic jacking device in operating position relative to the draft gear in the car center sill.

The hydraulic jacking device 1, shown particularly in FIG. 1, comprises hydraulic power cylinder means including a cylinder 13 having reciprocably operable therein a ram 14 characterized by an enlarged portion or ram head. The end or outer surface of cylinder 13 is contoured with a central flat section 16 to accommodate flat follower designs such as the well known A.A.R. Y-44 follower, as shown in FIGS. 2 and 3, and a spherical radius 15 to accommodate radius contoured followers such as the well known A.A.R. Y-46 followers shown in FIGS. 6 and 7. A sealing ring 17 is disposed in an annular groove 18 formed in ram 14 for preventing leakage of oil therepast when hydraulic fluid is pressurized between the ram and cylinder 13.

A casing or support member in the form of a transverse beam 19 is screwed onto the end of a rod or stem portion 20 of ram 14 opposite the ram head, said beam having a pair of diametrically opposed flanges 21 formed adjacent the extremities thereof and each having formed therein a longitudinal slot 22 in which respective locking or securing arms 23 are adapted to be pivotally secured, adjacent the inner ends thereof, by pins 24, respectively. Respective coil springs 25 serve to pivotally bias each arm 23 about pins 24 outwardly away from the axis of the jacking device 1. If preferred, a torsion type spring 25a anchored on pin 24, as shown in FIG. 1A, may be substituted for each of coil springs 25, with one bent arm of said spring 25a resting against one side of slot 22 and the other arm thereof bending up over and against the upper edge of arm 23, as viewed in FIG. 1A so as to bias arm 23 in a counterclockwise direction. The outer end of each mounting arm 23 has an angled notch 26 formed thereon by the main body of the arm and an axially extending tab portion 27. Notches 26 are provided for engaging the outer extremities of slots 9 of yoke 6 when the jacking device 1 is placed in operating position, as shown in FIG. 2. A support member 27a is disposed on the lower inner side of yoke 6 for supporting jacking device 1 in its installed position.

Figure 7:
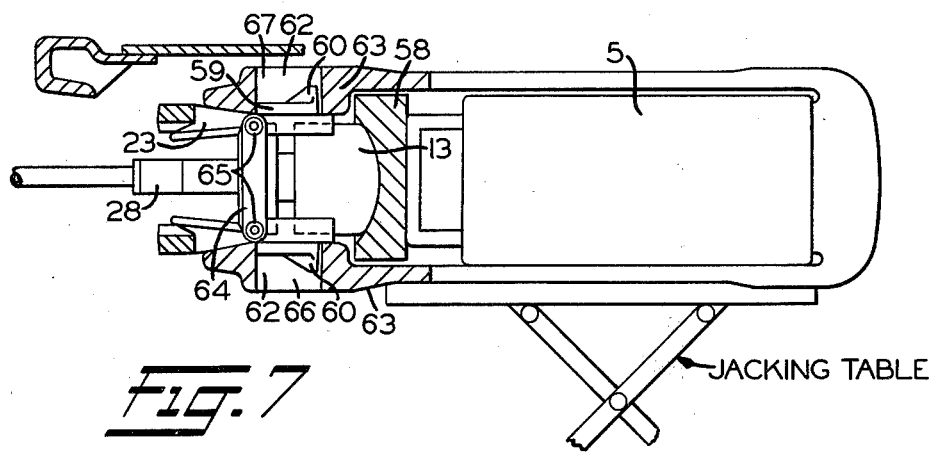
FIG. 7 is an elevational view of the adaptation shown in FIG. 6.

In order to place jacking device 1 in its operation position, the draft key and coupler must first be removed. A support table or similar lowering device, as shown in FIG. 7, should be in place before draft gear support plate 4 is removed. Next, support member 27a should be installed inside yoke 6 to provide alignment while installing jacking device 1. With the coupler 8 removed, jacking device 1 may then be inserted into the space vacated by the coupling assembly or the space ahead of the draft gear pocket, and urged inwardly until the front or contoured end of cylinder 13 contacts follower 10. Manipulation or handling of jacking device 1 during installation thereof is facilitated by a hollow handle 28 which is screwed into transverse beam 19 of said jacking device and will be more particularly described both functionally and structurally hereinafter.

When jacking device 1 is inserted in yoke 6, arms 23 are pivoted inwardly toward each other until the notched ends thereof clear the outer ends of slots 9, whereupon said arms snap into said slots. Notches 26 come to rest against the outer ends of slots 9 and thereby prevent said arms from slipping when a load is applied to the jacking device 1.

An annular cylinder cap 29, screwed into the open end of cylinder 13 and flush with the axial limits thereof, serves as a bearing for reciprocal motion of rod portion 20 of ram 14 and as a spring seat for a return spring 30 compressed between said cylinder cap and the ram head.

A hydraulic pressure hose 31, via which hydraulic pressure is supplied to jacking device 1, passes through hollow handle 28 and is connected to a coupling assembly 32 secured by a snap-type retaining ring 33 in the end of said handle adjacent the end of rod portion 20, said coupling assembly having a cylindrical ball cage 34 extending axially and disposed in a receiving bore 35 formed coaxially in the adjacent end of rod portion 20. The innermost end of ball cage 34 is partially closed to provide an annular valve seat 36. A ball-type cut-off valve 37 is urged toward a seated position on valve seat 36 by a spring 38 also enclosed in ball cage 34. In an unseated position of cut-off valve 37, the side thereof opposite annular valve seat 36 rests against the end of a fixed stem 39 fixedly secured in coupler assembly 32.

A check valve assembly, designated CV in FIG. 1, is disposed and axially aligned on the other side of cut-off valve 37 and has an enlarged portion of an operating plunger 40 biased thereagainst by a spring 41, both said plunger and spring being disposed in a multiple diameter axial bore 42 formed coaxially in rod portion 20 of ram 14. A sealing ring 43 surrounding ball cage 34 prevents leakage of oil pressure past said ball cage.

Also disposed in bore 42 is a ball-type one-way check valve 44 normally biased toward a seated position on an annular valve seat 45 opening to the portion of said bore in which plunger 40 and spring 41 are disposed, by a spring 46 compressed between said check valve and a spring retainer 47 axially fixed in said bore. Bore 42 extends throughout the entire axial length of ram 14 and its rod portion 20 which along with handle 28 provides passage or conduit means via which fluid pressure from hose 31 is supplied to a variable volume chamber 48 formed cooperatively by and between ram 14 and cylinder 13.

To place jacking device 1 into operation, handle 28 is screwed into transverse beam 19 until it is hand-tight. Handle 28 may now be used in assisting in lifting the jacking device into the opening ahead of draft gear 5 and sliding it therein until cylinder 13 is in contact with follower 10. See FIGS. 2 and 3. When arms 23 snap into position into slots 9 of yoke 6, handle 28 is retracted or unscrewed counterclockwise approximately one turn, whereupon plunger 40 no longer unseats ball 44, but, through compression spring 41, unseats cut-off valve 37 from seat 36. Handle 28, along with bore 42 thus provides conduit means via which pressurized fluid (supplied from a source to be hereinafter identified) may flow to pressure chamber 48 from hose 31 past unseated cut-off valve 37, around plunger 40 and spring 41, and through one-way check valve 44 which is unseated by the pressure of hydraulic fluid opposingly overcoming the biasing force of spring 46. With interruption of hydraulic fluid pressure flow in one direction, check valve 44 prevents flow in a reverse direction. With fluid pressure build-up in chamber 48, ram 14, acting through fluid in said chamber, is actuated from a relaxed state to an activated state for exerting or compressing force on draft gear 5. Thus, draft gear 5 is reduced from an extended state to a compressed state.

Figure 5:
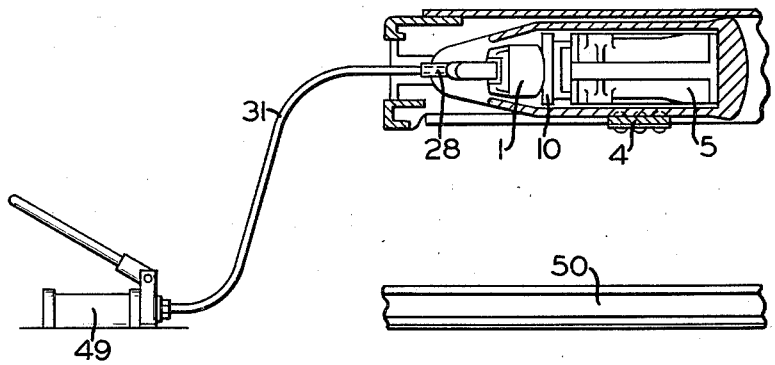
FIG. 5 is an elevational schematic view, on a smaller scale than FIGS. 1 and 2, showing hydraulic pumping means as connected to the hydraulic jacking device for providing operating pressure therefor.

As shown in FIG. 5 of the drawings, a hand-operated conventional hydraulic pump 49, which may be purchased commercially, may be used for effecting supply of hydraulic fluid to pressure chamber 48 of jacking device 1. If desired, a power-operated pump may be substituted for the hand-operated pump 49, which pump may be placed on the track bed represented symbolically by a rail section 50. Pump 49 should be stroked until follower 10 is spaced at least ⅛" away from the front lugs 12 or until a pump relief valve (not shown) in the pump begins to bypass the pressurized fluid, which is indicated by a hissing sound each time the pump is stroked and the follower makes no further movement.

In further preparation for removing draft gear 5, pressure is first released from hose 31 by setting a valve (not shown) in pump 49 to a release position. When hose 31 has been relieved of fluid pressure, handle 28 is screwed counter-clockwise for disconnecting said hose and pump 49 from jacking device 1. Check valve 44 prevents back flow of pressurized fluid from chamber 48 of hydrojack 1, so that draft gear 5 remains in a compressed state. The draft gear should be supported by either a lift truck or lift table, as seen in FIG. 7, while support plate 4 is removed, after which the entire assembly comprising the jacking device and the draft gear may be lowered out of the pocket.

Handle 28, with the hose, is screwed clockwise into the jacking device 1 until draft gear 5 is restored to its relaxed or extended state. After waiting a few seconds to insure that all pressure in the jacking device 1 has been dissipated and to permit return spring 30 to restore ram 14 to its relaxed state so that slack is restored between said jacking device and yoke 6, the jacking device may be removed therefrom.

The procedure above described for removing draft gear 5 is reversed for installing a draft gear that is not precompressed.

Figure 4:
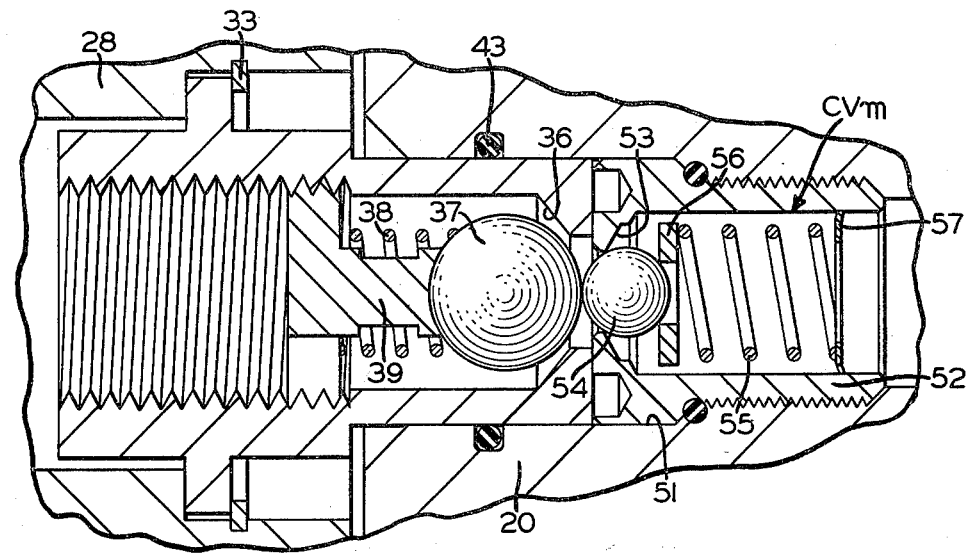
FIG. 4 is a horizontal fragmentary view, in section and on a larger scale than FIG. 1, showing a modification of a certain portion of the hydraulic jacking device shown in FIG. 1.

A modified version of check valve CV is shown in FIG. 4 and is designated as check valve assembly CVm. Check valve assembly CVm is the preferred embodiment and is disposed in axial alignment with coupling assembly 32 in a modified coaxial bore 51 formed in rod portion 20 of ram 14. Check valve assembly CVm comprises a valve cage 52 screw-threadedly secured in bore 51 and having an annular valve seat 53 formed at the end thereof adjacent cut-off valve 37. A ball-type check valve 54 disposed in valve cage 52 cooperates with valve seat 53, when in an unseated position relative thereto, for opening communication through bore 51, and when in a seated position thereon, for closing communication through said bore. Check valve 54 is biased toward its seated position on valve seat 53 by a spring 55 compressed between a spring seat 56 resting on said check valve and a spring retainer 57 axially fixed in valve cage 52 at the end opposite valve seat 53.

Check valve CVm functions similarly as check valve CV but is more simplified. When handle 28 is retracted or unscrewed one complete turn out of its innermost position in transverse beam 19 (not shown in FIG. 4), spring 55, acting on cut-off valve 37 through check valve 54, causes said cut-off valve to be unseated from seat 36, so that hydraulic fluid may flow therepast to pressure chamber 48 via bore 51. Check valve 54 is unseated by oil pressure during the compression stroke of pump 49 and acts to prevent flow in a reverse direction.

In the event the draft arrangement to be removed is provided with a follower plate having a contour not conforming to that of cylinder 13, various adapters of conforming contour may be provided for disposition between cylinder 13 and the follower plate of the particular draft gear to be removed. Some of these adapters are shown in FIGS. 6 through 11.

Figure 6:
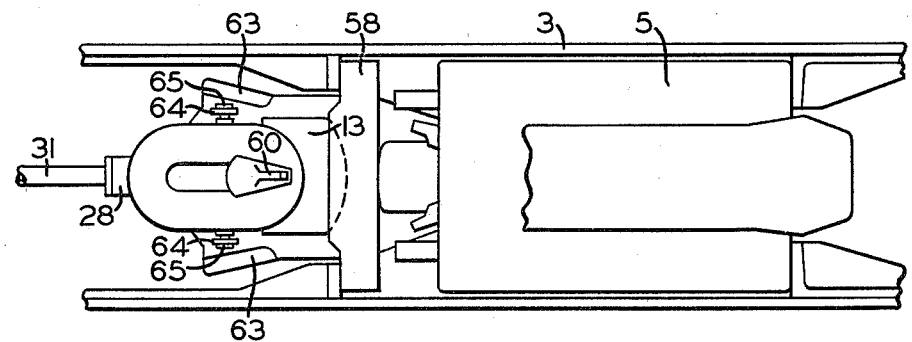
FIG. 6 is a horizontal view, mostly in outline and on a smaller scale than FIGS. 2 and 3 but larger than FIG. 5, showing an adaptation of the hydraulic jacking device with the butt end of a different type coupler arrangement.
Figure 7A:
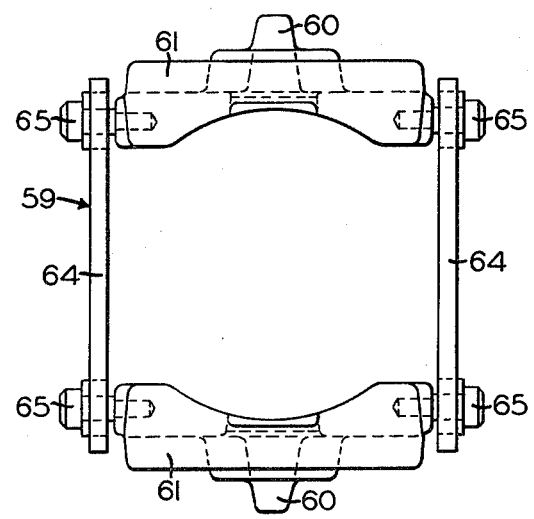
FIG. 7A is an elevational end view, in outline and on a larger scale than FIG. 7, of a certain component of the adaptation shown in FIG. 7.

The draft gear arrangement shown in FIGS. 6, 7, and 7A includes a spherically contoured follower 58 known in the art as a Y-46 follower for accommodating the complementarily contoured cylinder 13 of jacking device 1. This arrangement is applied with a conventional F type coupler set-up.

An encircling support adapter 59, shown separately in FIG. 7A, is shown in an installed disposition in the draft gear pocket in FIGS. 6 and 7. Adapter 59 is provided with two axially extended, diametrically oppositely disposed positioning or jacking lugs 60 formed on diametrically oppositely disposed arcuate members 61 and adapted for resting against the inner ends of a key slot 62 formed in a yoke 63 of draft gear 5. Adapter 59 is held in assembled disposition by two oppositely disposed support bars 64 secured to the respective ends of the arcuate members 61 by cap screws 65.

To install adapter 59, the adapter is inserted into the pocket ahead of draft gear 5 so that bottom lug 60 (see FIG. 7) drops into a lower pin hole 66 of yoke 63. Adapter 59 is then swung upwardly until upper lug 60 is located in an upper pin hole 67 of yoke 63. Jacking device 1 may then be slid into position in the adapter 59, as best seen in FIG. 7, between arcuate members 61. Operating procedure for removing and installing draft gear 5 is similar to that above discussed.

As is well known to those skilled in the art, certain cars such as coal-hauling cars, are designed so that they may be rotated about their longitudinal axes for dumping the contents without uncoupling the car from the train. Such cars are equipped with a rotary type coupler such as the ASF rotary coupler manufactured by American Steel Foundries. The butt end of a draft gear arrangement for use with an ASF rotary type coupler is shown in FIGS. 8 and 9 with the jacking device 1 in place.

As shown in FIGS. 8 and 9, a draft gear arrangement is provided with a spherically contoured follower 68 which is engaged by cylinder 13 of jacking device 1 when installed. An adapter hanger 69 is inserted into each of retainer key slots 70 of a yoke 71. With hangers 69 in place, an adapter 72 is inserted into each of the hangers 69 so as to be in oppositely facing vertical relation (see FIGS. 8 and 9) and to have respective positioning or jacking lugs 73 in contact with shoulders 74 of the respective adapters.

With adapters 72 in position, jacking device 1 is slid into position therebetween and slid forward until mounting arms 23 are biased into respective slots 75 of the adapters 72. Operation of the jacking device arrangement just described is similar to that discussed in connection with the arrangement shown in FIGS. 2 and 3.

Figure 11:
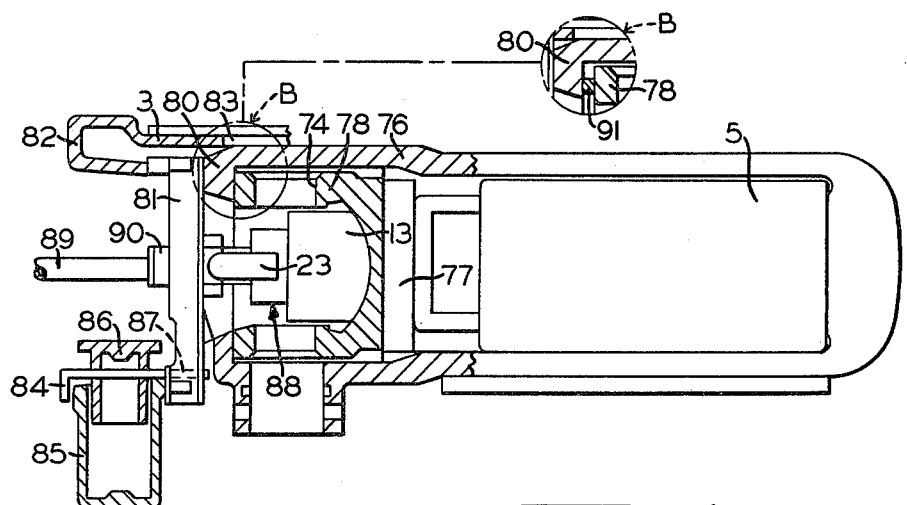
FIG. 11 is an elevational view of the adaptation shown in FIG. 10.

The arrangement shown in FIGS. 10 and 11 is applied to the butt end of a rotary type coupler also, specifically manufactured by National Castings. The draft arrangement, as shown, comprises the draft gear 5 having a yoke 76 associated therewith and a flat-surfaced follower 77. Yoke 76 is designed such as to accommodate a rotary connector 78 having a vertically disposed bore 79 for receiving a pin (not shown) by which a coupler shank (not shown) is keyed to said connector. Thus if a car, equipped with a rotary coupler, is rotated about its axis, rotary connector 78 may rotate within yoke 76. Yoke 76 is provided with a radially inwardly directed flange 80 at the outer axial extremity thereof for retaining rotary connector 78 in a normal axial position relative to the yoke.

Each of a pair of vertically disposed beams 81 is secured, as shown in FIG. 11, at each side of center sill 3 in position to have yoke 76 resting thereagainst. The upper ends of beams 81 are inserted between the end of yoke 76 and an inwardly-curling lip 82 formed on an upper cover plate 83 of center sill 3. The lower ends of beams 81 are supported by respective pins 84 resting on the top of a coupler carrier spring housing 85, in which springs (not shown) are disposed to provide resilient support for the coupler (not shown) which rests on an upper telescoping member 86, as shown in FIG. 11. Pins 84 are inserted in holes 87 provided in beams 81, respectively.

After the coupler has been removed, a jacking device 88 is inserted between beams 81 and into the pocket of rotary connector 78 left vacant by removal of the coupler shank (not shown). A hydraulic pressure hose 89 with a handle 90 is screwed into beam 19 of jacking device 88. However, handle 90 and jacking device 88 in this case, are not able to accommodate a coupling assembly such as coupling assembly 32 forming a part of the jacking device arrangement shown in FIG. 1. Thus, after hydraulic pressure supplied via hose 89 has compressed draft gear 5 for removal, said draft gear is "gagged" to maintain it in its compressed state by placing a spacer 91 between flange 80 of yoke 76 and rotary connector 78, as shown in the small view labeled B in FIG. 11 of the area in question.

Figure 12:
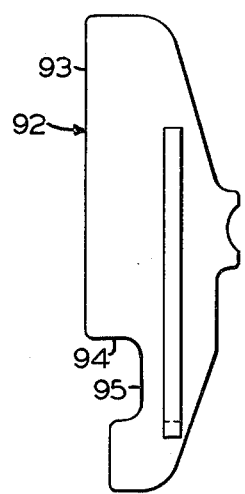
FIG. 12 is an elevational view of a component which may be used alternatively in the arrangement shown in FIGS. 10 and 11.

An alternative beam 92 is shown in FIG. 12, and may be used, if preferred, alternatively in place of beams 81 shown in FIGS. 10 and 11. An upper vertical surface 93 of beam 92 bears against the inner vertical surface of center sill 3, while a lower horizontal support surface 94 rests on spring housing 85, said lower horizontal surface being provided by a notch 95 cut into the beam. A spacer block 96 is welded on the outer vertical sides of each beam 92 to maintain proper location for correct positioning of arms 23. This structure eliminates the use of pins 84 as required in the use of beams 81 in FIGS. 10 and 11.

Having thus described the invention, what we claim as new and desire to secure by Letters Patent, is:

1. A jacking device for reducing a draft gear to a compressed state prior to installing or removing the draft gear into or from, respectively, a draft pocket formed in a railway car center sill in which the draft gear is operably disposable with one end adjacent an inner end of said pocket for resiliently transmitting buff or draft forces between the coupler and draft gear, said draft gear including a follower axially aligned at the other end thereof opposite said one end, and a yoke surrounding the draft gear and by which the coupler may be connected to the draft gear, said jacking device comprising:
   (a) a cylinder having a closed end,
   (b) a ram, including a ram head, reciprocably operable within said cylinder, said cylinder and said ram head cooperating to form therebetween a pressure chamber within said cylinder;
   (c) a rod portion extending coaxially from the side of said ram head opposite said pressure chamber, said ram head and said rod portion having a bore extending coaxially therethrough with one end opening to said pressure chamber;
   (d) a transverse beam member coaxially secured on the end of said rod portion opposite the ram head;
   (e) a pair of locking arms each having one end pivotally secured on said transverse beam member on opposite extremities thereof, extending axially away therefrom, and being pivotally biased angularly outwardly therefrom,
   (f) said locking arms being so disposed on said transverse beam and of such length as to be engageable with such yoke when the jacking device is inserted into such draft pocket and being effective, when said pressure chamber is charged with fluid under pressure, for transmitting compression forces to such follower and thereby effecting such compressed state of the draft gear;
   (g) conduit means connecting with the other end of said bore opposite its said one end so as to provide passage means via which fluid may be supplied to and pressurized in said pressure chamber; and
   (h) checking means for retaining said draft gear in said compressed state during removal or installation thereof.

2. A jacking device, as set forth in claim 1, further characterized by an annular cylinder cap having a central opening therein and fixed in the end of said cylinder opposite its closed end to provide a bearing for said rod portion, and a return spring compressed between said cylinder cap and said ram head for restoring said ram and cylinder to normal relaxed positions upon release of pressure from said chamber.

3. A jacking device, as set forth in claim 1, wherein said checking means comprises a two-part valve means having one position in which fluid may flow in one direction to said pressure chamber but checked in a reverse direction, said valve means being positionable in a different position for releasing fluid pressure from said pressure chamber.

4. A jacking device, as set forth in claim 3, wherein said conduit means comprises a tubular handle having one end axially screw-threadedly positionable in said transverse beam member for providing means for facilitating handling of the jacking device either alone or together with the draft gear when connected therewith.

5. A jacking device, as set forth in claim 4, wherein one part of said two-part valve means comprises cut-off valve means coaxially disposed, partly in said other end of said bore and partly in said one end of said tubular handle and being operably connected thereto, said cut-off valve means being biased to an open position in which communication between said tubular handle and said bore is open, and being operable by screwing of said handle a predetermined amount into the transverse beam member, to a cut-off position in which said communication is closed.

6. A jacking device, as set forth in claim 6, wherein a second part of said two-part valve means comprises check valve means interposed in said bore between said cut-off valve means and said pressure chamber, said check valve means being normally biased to a closed position in which reverse flow through said bore from said chamber to said tubular handle is cut off and being operable to an open position by fluid pressure, when said cut-off valve is in its said open position, to permit flow of fluid pressure to said chamber.

7. A jacking device, as set forth in claim 6, wherein said two-part valve means further comprises a plunger member interposed axially between said cut-off valve means and said check valve means and effective, when said handle is screwed into said transverse beam an amount less than said predetermined, amount, for operating said cut-off valve to its said open position.

8. A jacking device, as set forth in claim 6, further characterized by a coupling assembly coaxially disposed in said one end of said tubular handle and to which a pressure hose may be coupled for providing fluid pressure for the pressure chamber, said coupling assembly including a ball valve cage having an annular valve seat formed at one end cooperating with a ball-type cut-off valve of the cut-off valve means disposed in said cage with a spring for biasing said cut-off valve toward its said closed position.

9. A jacking device, as set forth in claim 8, wherein said check valve means comprises a ball-type check valve member in abutting contact with said cut-off ball valve and a spring for biasing said check valve member toward its said closed position and into abutting contact with said cut-off ball valve.

10. A jacking device, as set forth in claim 1, wherein each of said locking arms has an angled notch formed on the end thereof opposite the end secured to the transverse beam, said locking arms being biased outward so that said angled notches are engageable against the adjacent ends of key slots in such yoke.

11. A jacking device, as set forth in claim 1, wherein such yoke is provided with a key slot in each arm of such yoke substantially parallel to each other and to the axis of such yoke, said jacking device further comprising an encircling adapter member transversely positionable at the opening of the draft pocket in a predetermined axial position relative to the draft gear, said adapter member having two axially extending, diametrically oppositely disposed jacking lugs formed on diametrically oppositely disposed arcuate members, said lugs being engageable with the inner ends of the key slots in such yoke when said jack is in an installed position, and said adapter member being engageable by said locking arms, respectively.

12. A jacking device, as set forth in claim 1, wherein such draft gear has a rotary connector coaxially rotatably disposed in such yoke, said jacking device further comprises a beam member vertically secured at each side of the opening of the draft pocket for engaging the respective said locking arms when the jacking device is inserted into such rotary connector.

13. A jacking device, as set forth in claim 1, wherein such yoke has a key slot formed in each arm thereof, said jacking device further comprising: a set of hanger members each having an elongated slot formed therein and into which said locking arms are engageable upon insertion of the jack into the draft pocket, and an adapter member disposed in each of said hangers and engageable with such key slot.

14. A jacking device, as set forth in claim 1, wherein at least a portion of the outer abutting surface of said cylinder is a generally spherical section.

15. The jacking device, as set forth in claim 14, wherein at least a portion of the outer abutting surface of said cylinder is generally planar, and said planar surface in general lies in a plane that is generally perpendicular to the axis of said cylinder.

16. A jacking device, as set forth in claim 13, in which at least a portion of the outer abutting surface of said cylinder is a generally spherical section.

* * * * *